(No Model.) 2 Sheets—Sheet 1.

J. P. TIRRELL.
GONG OR TAP BELL.

No. 416,243. Patented Dec. 3, 1889.

Witnesses
Geo. W. Breck
Edward Thorpe

Inventor
Jacob P. Tirrell
By his Attorneys
Wiedersheim & Kintner

N. PETERS. Photo-Lithographer, Washington, D. C.

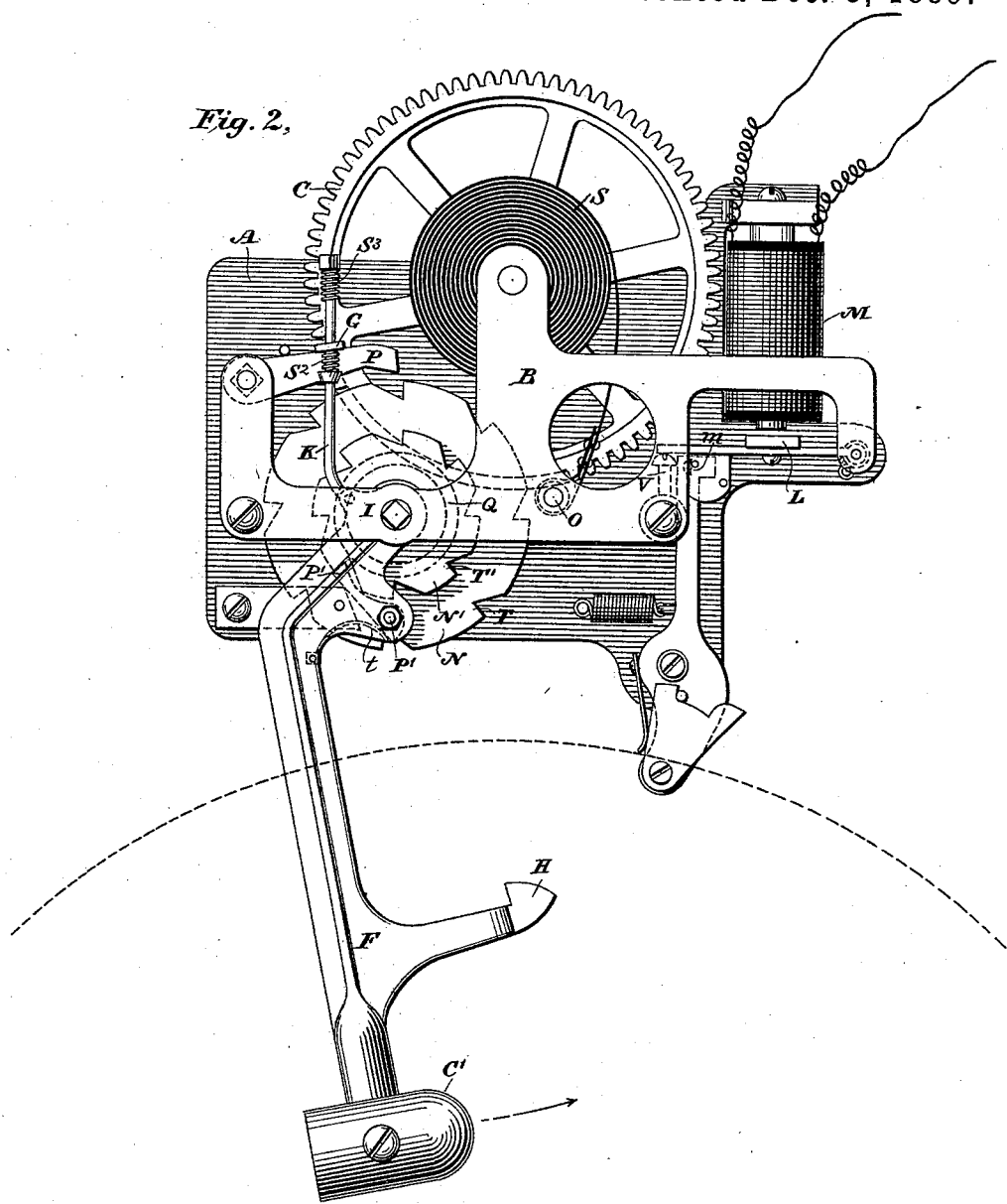

UNITED STATES PATENT OFFICE.

JACOB P. TIRRELL, OF BOSTON, MASSACHUSETTS, ASSIGNOR TO DAVID ROUSSEAU, OF NEW YORK, N. Y.

GONG OR TAP-BELL.

SPECIFICATION forming part of Letters Patent No. 416,243, dated December 3, 1889.

Application filed March 15, 1889. Serial No. 303,413. (No model.)

*To all whom it may concern:*

Be it known that I, JACOB P. TIRRELL, of Boston, in the county of Suffolk and State of Massachusetts, have made a new and useful Invention in Gongs or Tap-Bells, of which the following is a specification.

My invention relates particularly to improvements in that class of bells or gongs which operate by or through the agency of an impelling power, as a spring or a weight, and are controlled by electro-magnetic means.

In the operation of large gongs or bells—such as are used in railway-stations or at the central stations of fire-alarm systems—difficulty is often found in devising means for electrically controlling the operation of mechanism sufficiently powerful to operate the gong or bell. I am aware, however, that electro-magnetic-controlling devices have been devised for this purpose, and it is to this type of apparatus that my improvements are especially directed.

My invention will be better understood by referring to the accompanying drawings and also to the following description, after which I will particularly point out in the claims the features which I regard as novel with me.

Figure 1:
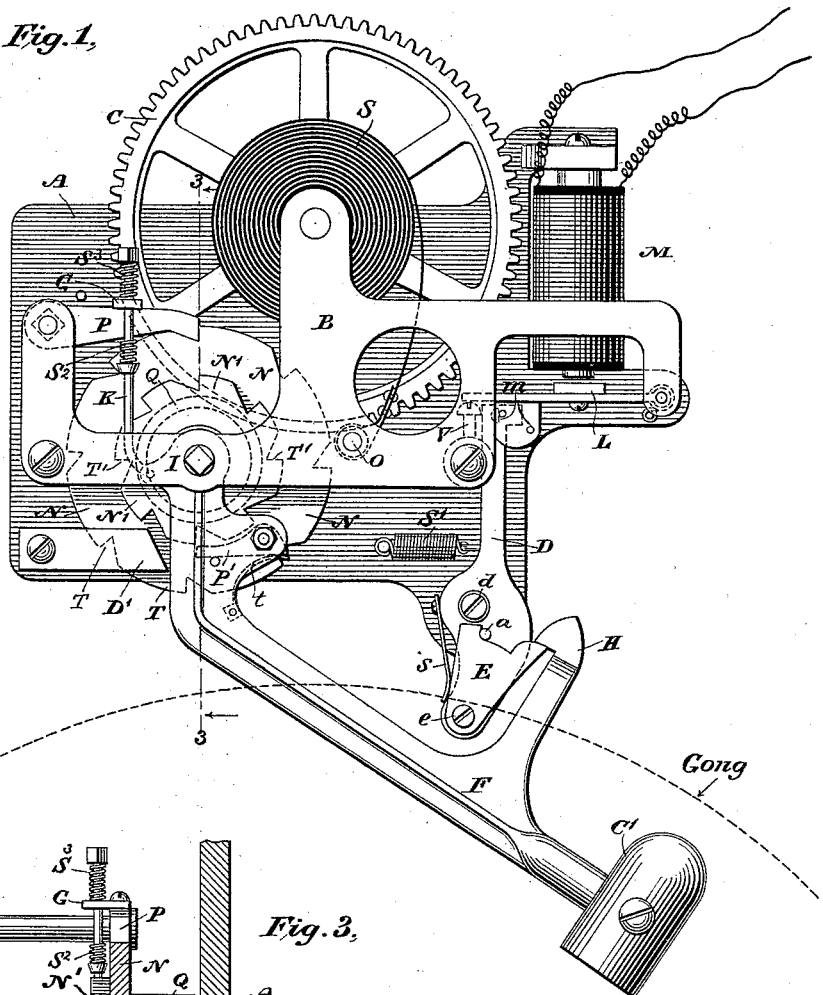
Figure 3:
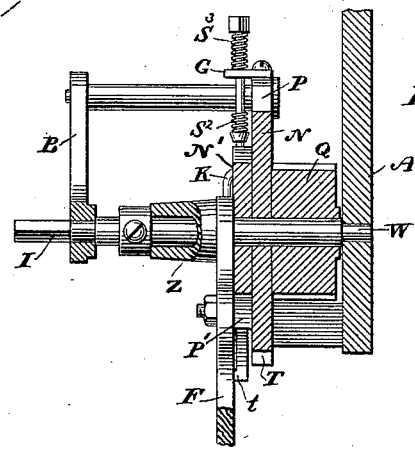

In the drawings, Figure 1 is a side or elevational view of the entire apparatus, showing the bell-clapper in its normal or locked position. Fig. 2 is a similar view showing the bell-clapper in the act of striking; and Fig. 3 is a detail sectional view on line 3 3, Fig. 1.

The outline of the gong or bell is represented in both Figs. 1 and 2 in dotted lines, and it, with the base A to the apparatus, is supported in any desired manner on the wall or elsewhere.

The base A supports the frame-work B of the mechanism, which I will now describe.

C is a main driving gear-wheel, having one end of a propelling-spring S attached to its shaft, the other end thereof being attached to the frame at O. This gear-wheel meshes with a pinion Q, keyed to shaft W. (See Fig. 3.)

N and N' are two ratchet-wheels, also keyed to shaft W, the former designed to act as a holding-ratchet under influence of pawl P, pivoted to the frame, and the latter as a propelling-ratchet for driving the clapper C', attached to a striking-arm F, which latter is journaled on shaft W, with a sleeve Z, as shown in Fig. 3.

I is an arm or lever rigidly secured to or a part of the striking arm or lever F, and to its free end is pivoted a push-rod K, having a sliding bearing through a cross-bar G, and attached to pawl P, adapted to control the operation of this pawl, as will be described later on.

P' is a spring-pressed pawl pivotally secured to the striking-arm F, and adapted to take in the teeth T' of the propelling-ratchet N' on the backward stroke of the striking arm or lever F. Near the outer or free end of the striking arm or lever F is a hook-shaped extension H, adapted to bear, when in the position shown in Fig. 1, against the beveled shoulder of a dog E, pivoted at *e*. This dog is held normally against a pin *a* by a flat leaf-spring *s*, and all of said parts are carried on the shorter arm of a lever D, pivoted to the frame at *d*, and carrying at its upper end an escapement *m*, normally held against the weight of the lever F and clapper C' by spring S' and the armature L of the controlling electro-magnet M.

V is an adjustment-screw for regulating the adjustment of the escapement and armature-lever L.

$S^3$ and $S^2$ are spiral springs on the push-rod K, the former for forcing the pawl P into place in a tooth of ratchet-wheel N on the downward stroke of said rod, and the latter for releasing the pawl on the backward stroke of the striking-arm F.

D' is a guide-block lying in the path of the pawl P', which is normally held away from the teeth of ratchet N' by a leaf-spring *t*, (shown in dotted lines,) said block D' being adapted to force the pawl inward into contact with any one of the teeth T', so that when the ratchet advances it will come into operative relation with the pawl, as will be explained later on.

I will now describe the mode of operation. Normally the apparatus is in the position shown in Fig. 1, with the striking-lever F locked in its uppermost position and the detent-lever D held by armature-lever L, the magnet M being demagnetized. On closing the circuit, for an instant only, through magnet M, and then breaking it again, the apparatus will give one stroke, as follows: The detent-lever D, having been released, turns about pivot $d$, under the weight of the striking-lever F and clapper C', until the hook H is released, the lever thus being allowed to make its full backward stroke, at the end of which the free end of pawl P' rides up against the guide-block D' and is forced against one of the teeth T' of ratchet N'. At the same time the push-rod K is carried upward by the arm I, thus bringing the spiral spring $S^2$ firmly in contact with the under side of the cross-bar G, attached to the pawl P. The striking force due to lever F and clapper C' on this back-stroke is sufficient, in acting through the pawl P' and ratchet N', to momentarily overcome the greater portion of the strain on pawl P from ratchet N and spring S, and to therefore permit the spring $S^2$ to raise said pawl out of contact with that tooth T with which it has bearing. As soon as this occurs the spring S, acting through gear C, pinion Q, and ratchet N' and pawl P', forces the lever F and clapper C' forward with great force, and causes the latter to strike the gong a blow and the hook H to be restored to its normal or locked position, provided the circuit is open; or if it is closed permanently the apparatus will continue repeating the strokes until the spring runs down. It will thus be seen that with this apparatus I have either a single or multiple tap gong or bell, as desired, and by holding the circuit closed can give any number of strokes upon the gong.

Having thus described my invention, what I claim, and desire to secure by Letters Patent of the United States, is—

1. In a gong or bell for signaling purposes, the combination of the following parts: a spring-impelled mechanism, a pawl and ratchet for holding said mechanism from operating, a striking-lever carrying a pawl which is adapted to take in a second ratchet borne by the same shaft as the first ratchet, a push-lever connected to the striking-lever and adapted to release or restore the first-named pawl according to the position of the striking-lever, a detent-lever, a locking-dog, and an electro-magnet having an armature which normally holds the detent-lever and its dog in locking position, substantially as described.

2. A gong or bell having the following elements in combination: a spring-impelled train of gear, a ratchet on the last shaft of said train, a pawl which normally holds said train from running, a second ratchet also fixed to the last shaft, a striking-lever loosely sleeved on the same shaft and carrying a spring-pressed pawl adapted to take in the teeth of the last-named ratchet, but normally held out of contact with the face of the ratchet-wheel, a push-lever pivotally attached to an arm on the striking-lever and carrying springs which bear, respectively, on opposite sides of the first-named pawl, a hook near the free end of the striking-lever, a pivoted detent-lever carrying a pivoted dog at one end adapted to hold the hook on the striking-lever, and an electro-magnet with an armature for holding the detent-lever and its dog in locking position, substantially as described.

JACOB P. TIRRELL.

Witnesses:
ARTHUR W. CROSSLEY,
A. D. HARRISON.